United States Patent
Umeyama et al.

(10) Patent No.: US 10,431,814 B2
(45) Date of Patent: Oct. 1, 2019

(54) NON-AQUEOUS ELECTROLYTE SECONDARY BATTERY AND METHOD FOR MANUFACTURING THE SAME

(71) Applicant: TOYOTA JIDOSHA KABUSHIKI KAISHA, Toyota-shi, Aichi-ken (JP)

(72) Inventors: Hiroya Umeyama, Okazaki (JP); Akihiro Taniguchi, Ashiya (JP); Shuji Tsutsumi, Ikoma (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 647 days.

(21) Appl. No.: 14/980,202

(22) Filed: Dec. 28, 2015

(65) Prior Publication Data
US 2016/0248085 A1 Aug. 25, 2016

(30) Foreign Application Priority Data
Feb. 20, 2015 (JP) ................. 2015-031740

(51) Int. Cl.
| | |
|---|---|
| *H01M 4/36* | (2006.01) |
| *H01M 4/04* | (2006.01) |
| *H01M 4/13* | (2010.01) |
| *H01M 4/139* | (2010.01) |
| *H01M 4/62* | (2006.01) |
| *H01M 4/02* | (2006.01) |

(52) U.S. Cl.
CPC .......... *H01M 4/366* (2013.01); *H01M 4/043* (2013.01); *H01M 4/13* (2013.01); *H01M 4/139* (2013.01); *H01M 4/624* (2013.01); *H01M 2004/021* (2013.01)

(58) Field of Classification Search
CPC ........ H01M 4/366; H01M 4/043; H01M 4/13; H01M 4/139; H01M 4/624; H01M 2004/021
USPC .......................................... 429/128
See application file for complete search history.

(56) References Cited

U.S. PATENT DOCUMENTS

| | | | |
|---|---|---|---|
| 2006/0093920 A1 | 5/2006 | Cheon et al. | |
| 2009/0087743 A1 | 4/2009 | Kim et al. | |
| 2015/0111106 A1* | 4/2015 | Son ..................... | H01M 4/0471 429/223 |
| 2016/0043398 A1* | 2/2016 | Yanagihara ......... | H01M 10/052 307/10.1 |
| 2016/0172673 A1* | 6/2016 | Toya ..................... | C01G 53/50 429/223 |

FOREIGN PATENT DOCUMENTS

| | | |
|---|---|---|
| JP | 2006-128119 A | 5/2006 |
| JP | 2007-103041 A | 4/2007 |
| JP | 2009-035598 A | 2/2009 |

(Continued)

*Primary Examiner* — Cynthia H Kelly
*Assistant Examiner* — Rashid A Alam
(74) *Attorney, Agent, or Firm* — Sughrue Mion, PLLC (57) ABSTRACT

A non-aqueous electrolyte secondary battery includes a positive electrode composite material layer, the positive electrode composite material layer including: a composite particle including a positive electrode active material, a first conductive material and a binder; and a second conductive material arranged on a surface of the composite particle and having a DBP oil absorption number smaller than that of the first conductive material.

14 Claims, 10 Drawing Sheets

(56) References Cited

FOREIGN PATENT DOCUMENTS

| | | | | |
|---|---|---|---|---|
| JP | 2014035859 A | 2/2014 | | |
| JP | 2014102967 A | 6/2014 | | |
| JP | WO 2015012282 A1 * | 1/2015 | ............ | C01G 53/50 |
| KR | 10-2009-0034164 A | 4/2009 | | |
| WO | 2014/141960 A1 | 9/2014 | | |
| WO | WO 2014205211 A1 * | 12/2014 | ............ | H01M 4/525 |

* cited by examiner

NON-AQUEOUS ELECTROLYTE SECONDARY BATTERY AND METHOD FOR MANUFACTURING THE SAME

This nonprovisional application is based on Japanese Patent Application No. 2015-031740 filed on Feb. 20, 2015 with the Japan Patent Office, the entire contents of which are hereby incorporated by reference.

BACKGROUND OF THE INVENTION

Field of the Invention

The present invention relates to a non-aqueous electrolyte secondary battery and a method for manufacturing the same.

Description of the Background Art

Japanese Patent Laying-Open No. 2007-103041 discloses a positive electrode composite material layer containing a positive electrode active material having an average primary particle size of 0.1 to 5 μm, and carbon black having a DBP (Di-Butyl Phthalate) oil absorption number of 100 to 160 ml/100 g.

SUMMARY OF THE INVENTION

Figure 10:
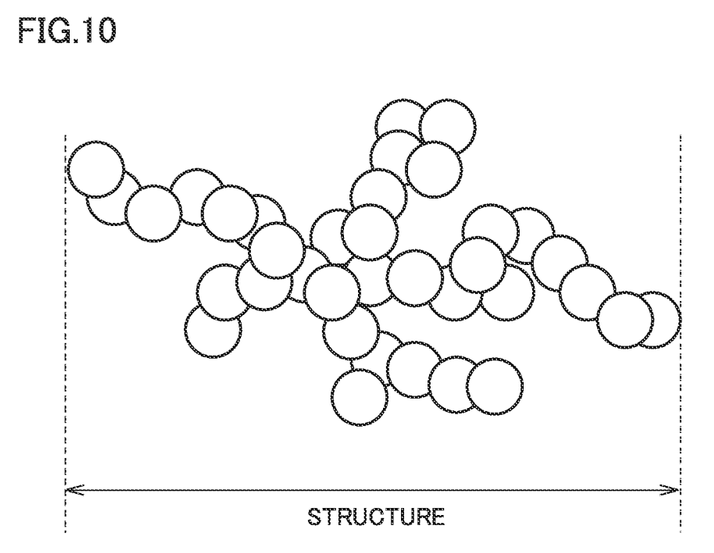
FIG. 10 is a schematic view illustrating a structure of a conductive material.

Carbon black is widely used as a conductive material for a positive electrode. Generally, carbon black has a complicated three-dimensional structure in which spherical primary particles are coupled to one another (see FIG. 10). The spread of this three-dimensional structure is also called "structure". Conventionally, the size of the structure has been evaluated by a DBP oil absorption number. The DBP oil absorption number is an index indicating how much quantity of oil (organic solvent) can be absorbed in a gap of the structure. Normally, as the DBP oil absorption number increases, the structure is evaluated as having grown greatly.

According to Japanese Patent Laying-Open No. 2007-103041, carbon black having a DBP oil absorption number of 100 to 160 ml/100 g is reasonably small in structure and excellent in dispersibility. Carbon black excellent in dispersibility is expected to be helpful in forming a conductive network in the positive electrode composite material layer.

However, in a non-aqueous electrolyte secondary battery in which such a conductive material is used, an increase in resistance tends to be large when high-rate (large-current) charging and discharging are repeated (hereinafter referred to as "at the time of the high-rate cycle").

Thus, an object of the present invention is to suppress an increase in resistance at the time of the high-rate cycle.

[1] A non-aqueous electrolyte secondary battery includes a positive electrode composite material layer, the positive electrode composite material layer including: a composite particle including a positive electrode active material, a first conductive material and a binder; and a second conductive material arranged on a surface of the composite particle and having a DBP oil absorption number smaller than that of the first conductive material.

The electrolyte of the non-aqueous electrolyte secondary battery is a liquid electrolyte obtained by dissolving a supporting electrolyte in an organic solvent. Therefore, as to how much quantity of electrolyte is absorbed by the conductive material, the DBP oil absorption number can be used as an index. When a conductive material having a large DBP oil absorption number is mixed in the positive electrode composite material layer, the electrolyte is easily retained near the positive electrode active material adjacent to the conductive material because the conductive material absorbs the electrolyte easily. Normally, such a state is expected to contribute to enhancement of the battery performance.

However, according to the research by the inventors of the present invention, when the conductive material having a large DBP oil absorption number is used, an increase in resistance at the time of the high-rate cycle tends to be large. The inventors of the present invention disassembled and analyzed in detail the battery after the cycle. Then, it turned out that variations occurred in distribution of the electrolyte in the in-plane direction of the positive electrode composite material layer. When such variations occur in distribution of the electrolyte, the electrode reaction may become non-uniform and local degradation is more likely to progress.

As to a factor responsible for the occurrence of variations in distribution of the electrolyte, the inventors of the present invention consider as follows.

The positive electrode composite material layer of the non-aqueous electrolyte secondary battery expands and contracts with the charging and discharging reaction. A quantity of expansion and a quantity of contraction in the positive electrode composite material layer are much larger in the high-rate cycle than in the normal-rate cycle. With the expansion and contraction of the positive electrode composite material layer, the electrolyte included in the positive electrode composite material layer is pushed away in the in-plane direction of the positive electrode composite material layer and flows outside from a side surface of the positive electrode composite material layer. On the other hand, with the expansion and contraction of the positive electrode composite material layer, the electrolyte that is in contact with the side surface of the positive electrode composite material layer is, in some cases, brought back to the inside of the positive electrode composite material layer. At this time, however, when the DBP oil absorption number of the conductive material is large, the electrolyte is easily captured by the conductive material near the side surface of the positive electrode composite material layer and the electrolyte cannot permeate the inside of the positive electrode composite material layer sufficiently. As a result, the electrolyte is more likely to accumulate near the side surface of the positive electrode composite material layer, and thus, variations occur in distribution in the in-plane direction of the electrolyte.

Consideration will also be given to a case of using a conductive material having a small DBP oil absorption number. In this case, a flow of the electrolyte in the in-plane direction is less likely to be inhibited by the conductive material and variations are less likely to occur in distribution of the electrolyte in the in-plane direction. However, although the variations in distribution decrease, the electrolyte easily flows out from the positive electrode composite material layer, and thus, an absolute quantity of the electrolyte held in the positive electrode composite material layer decreases easily. Therefore, in this case as well, an increase in resistance caused by the high-rate cycle cannot be suppressed.

Based on the aforementioned considerations, the conductive material must have the following two contradictory properties: easy to absorb and hold the electrolyte; and not inhibiting the flow of the electrolyte. Thus, in the non-aqueous electrolyte secondary battery in [1] above, two types of conductive materials having different DBP oil absorption quantities are used to achieve these two contradictory properties. Namely, the positive electrode composite material layer includes: a composite particle including a positive electrode active material, a first conductive material and a binder; and a second conductive material arranged on a surface of the composite particle and having a DBP oil absorption number smaller than that of the first conductive material. According to this configuration, the electrolyte having permeated the inside of the composite particle is captured by the first conductive material having a large DBP oil absorption number. As a result, the electrolyte can be abundantly held near the positive electrode active material. Furthermore, the second conductive material arranged on the surface of the composite particle, i.e., between the composite particles has a small DBP oil absorption number and does not inhibit the flow of the electrolyte in the in-plane direction. Therefore, according to the non-aqueous electrolyte secondary battery in [1] above, a decrease in absolute quantity of the electrolyte held in the positive electrode composite material layer can be suppressed and occurrence of variations in distribution thereof can also be suppressed. As a result, an increase in resistance at the time of the high-rate cycle can be suppressed.

[2] Preferably, in [1] above, the DBP oil absorption number of the first conductive material is equal to or larger than 100 ml/100 g, and the DBP oil absorption number of the second conductive material is equal to or larger than 30 ml/100 g and equal to or smaller than 90 ml/100 g. As a result, the effect of suppressing an increase in resistance is expected to be enhanced.

[3] The non-aqueous electrolyte secondary battery in [1] or [2] above can be manufactured by the following manufacturing method. A method for manufacturing the non-aqueous electrolyte secondary battery includes: a first step of obtaining a first granulated material by mixing the positive electrode active material, the first conductive material and the binder; a second step of obtaining a second granulated material by mixing the first granulated material and the second conductive material; and a third step of forming the positive electrode composite material layer by shaping the second granulated material into a sheet.

In [3] above, two-stage granulation is performed. In [3] above, the first granulated material is a powder formed by the composite particle including the positive electrode active material, the first conductive material and the binder. By mixing this first granulated material and the second conductive material, the second conductive material can adhere to the surface of the composite particle. By shaping the second granulated material thus obtained into a sheet, without dispersing the second granulated material in a solvent, the positive electrode composite material layer can be formed, with the arrangement relationship among the positive electrode active material, the first conductive material and the second conductive material being maintained. According to a conventionally-used paste method, i.e., a method for dispersing a positive electrode active material, conductive materials and the like in a solvent to fabricate a paste, and coating the paste onto a positive electrode collector foil, two types of conductive materials intermingle with each other and thus it is difficult to achieve the aforementioned arrangement relationship.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment (hereinafter referred to as "the present embodiment") of the present invention will be described hereinafter, while the present embodiment is not limited thereto.

[Non-Aqueous Electrolyte Secondary Battery]

Figure 1:
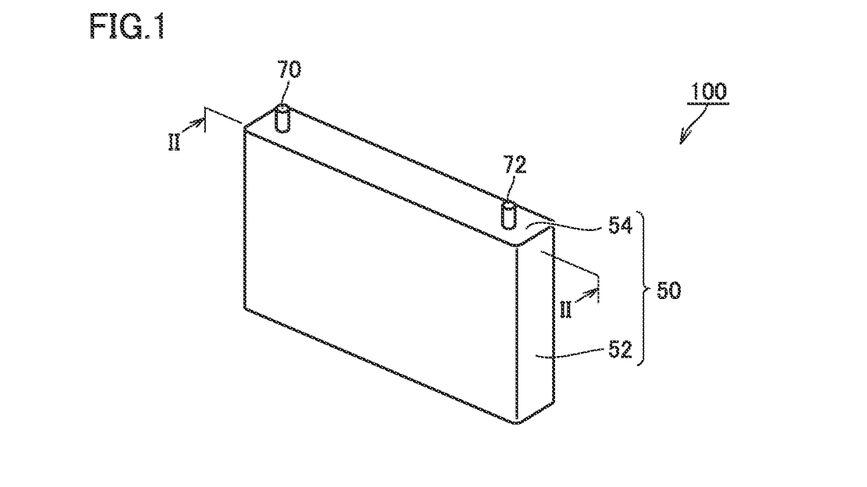
FIG. 1 is a schematic view showing one example of a configuration of a non-aqueous electrolyte secondary battery according to an embodiment of the present invention.

FIG. 1 is a schematic view showing one example of a configuration of a non-aqueous electrolyte secondary battery according to the present embodiment. As shown in FIG. 1, a non-aqueous electrolyte secondary battery 100 includes a package 50. A material of package 50 is, for example, an aluminum (Al) alloy. Package 50 is configured by a prismatic case 52 and a lid 54. Lid 54 is provided with a positive electrode terminal 70 and a negative electrode terminal 72. Lid 54 may be provided with a liquid injection port, a safety valve, a current interrupting device (all are not shown) and the like.

Figure 2:
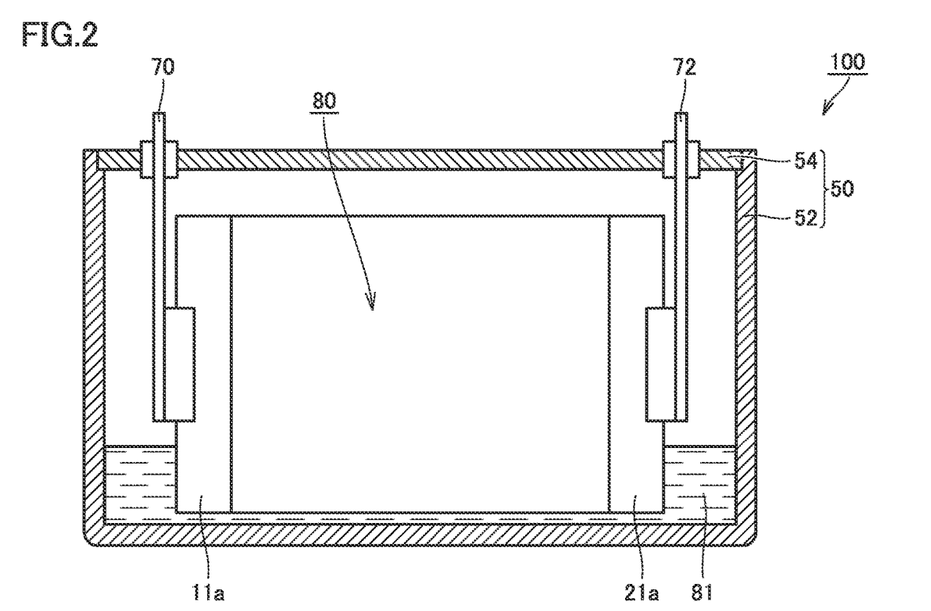
FIG. 2 is a schematic cross-sectional view taken along line II-II in FIG. 1.

FIG. 2 is a schematic cross-sectional view taken along line II-II in FIG. 1. As shown in FIG. 2, an electrode assembly 80 and an electrolyte 81 are incorporated into package 50. Electrode assembly 80 is connected to positive electrode terminal 70 and negative electrode terminal 72. Electrolyte 81 also permeates the inside of electrode assembly 80.

Figure 3:
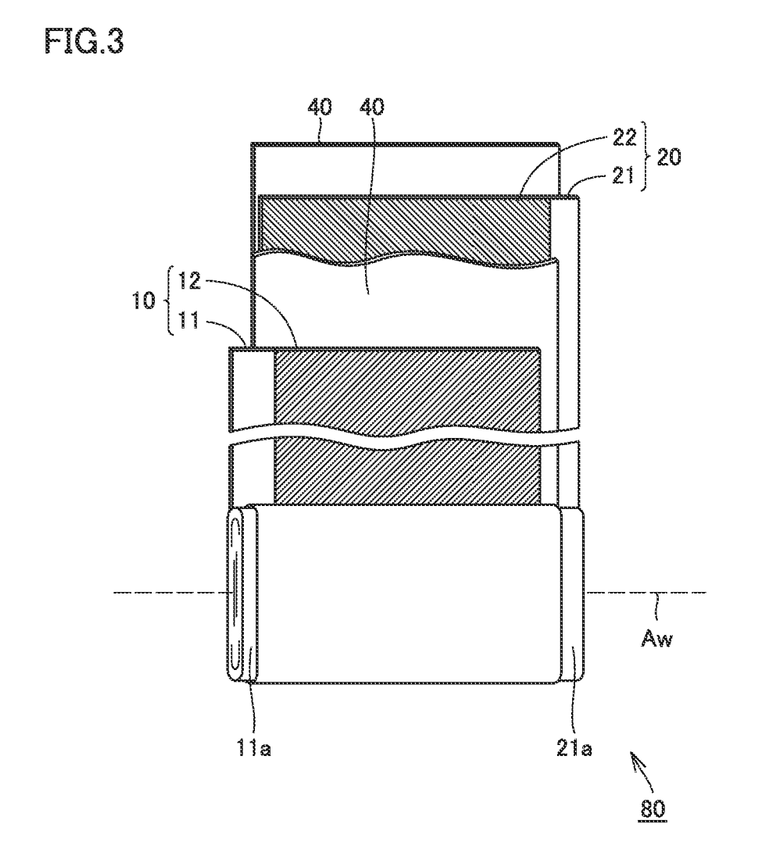
FIG. 3 is a schematic view showing one example of a configuration of an electrode assembly according to the embodiment of the present invention.

FIG. 3 is a schematic view showing one example of a configuration of the electrode assembly according to the present embodiment. As shown in FIG. 3, electrode assembly 80 is a wound-type electrode assembly. Namely, electrode assembly 80 is an electrode assembly formed by stacking a positive electrode 10 and a negative electrode 20 with a separator 40 interposed therebetween, and winding positive electrode 10 and negative electrode 20.

[Positive Electrode]

Figure 4:
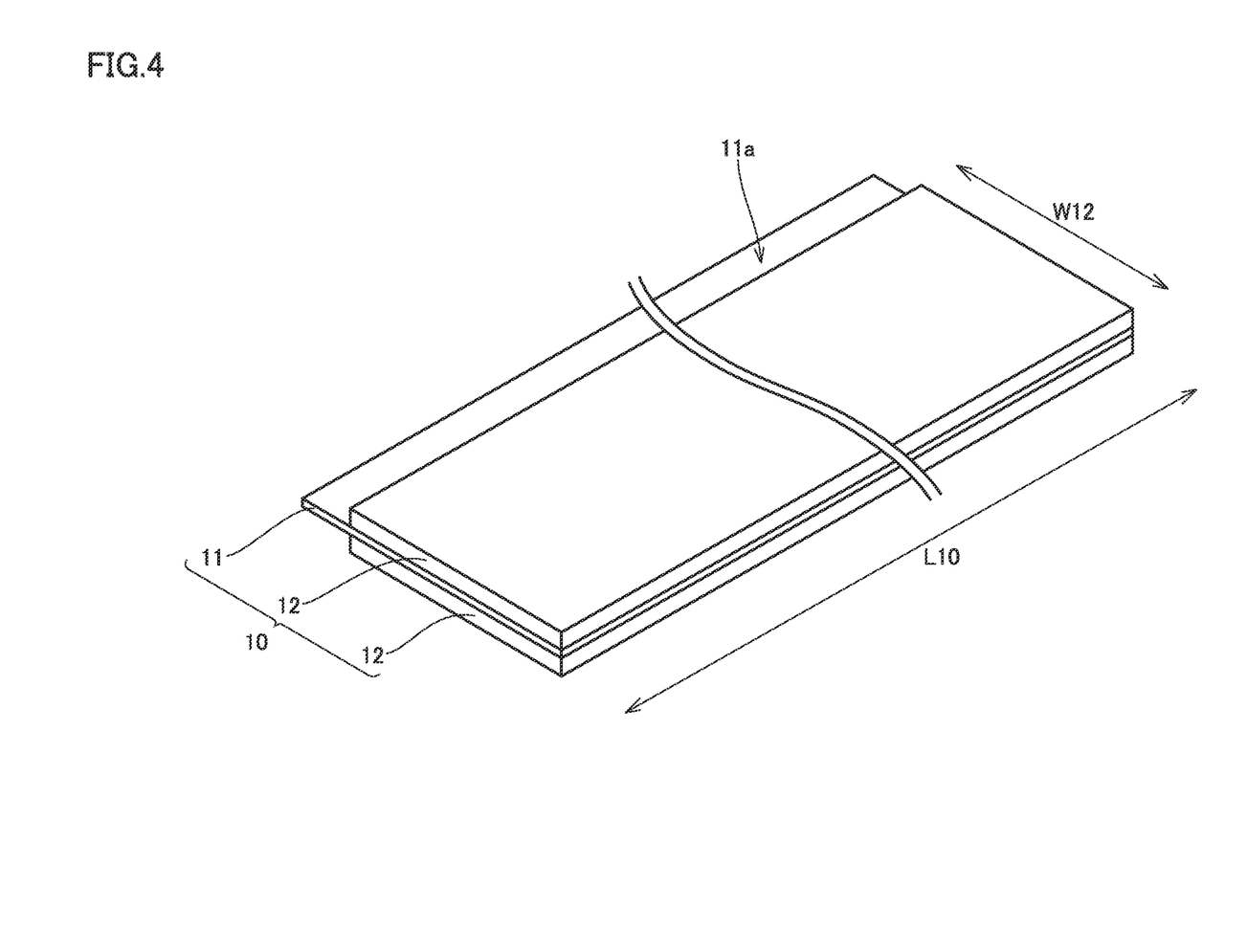
FIG. 4 is a schematic view showing one example of a configuration of a positive electrode according to the embodiment of the present invention.

FIG. 4 is a schematic view showing one example of a configuration of the positive electrode according to the present embodiment. As shown in FIG. 4, positive electrode 10 is a long strip-like sheet member. Positive electrode 10 includes a positive electrode collector foil 11, and positive electrode composite material layers 12 arranged on both main surfaces of positive electrode collector foil 11. Positive electrode collector foil 11 is, for example, an Al foil. A foil exposed portion 11a where positive electrode collector foil 11 is exposed from positive electrode composite material layer 12 serves as a site for connection with positive electrode terminal 70 in electrode assembly 80 (see FIG. 2).

[Positive Electrode Composite Material Layer]

Figure 5:
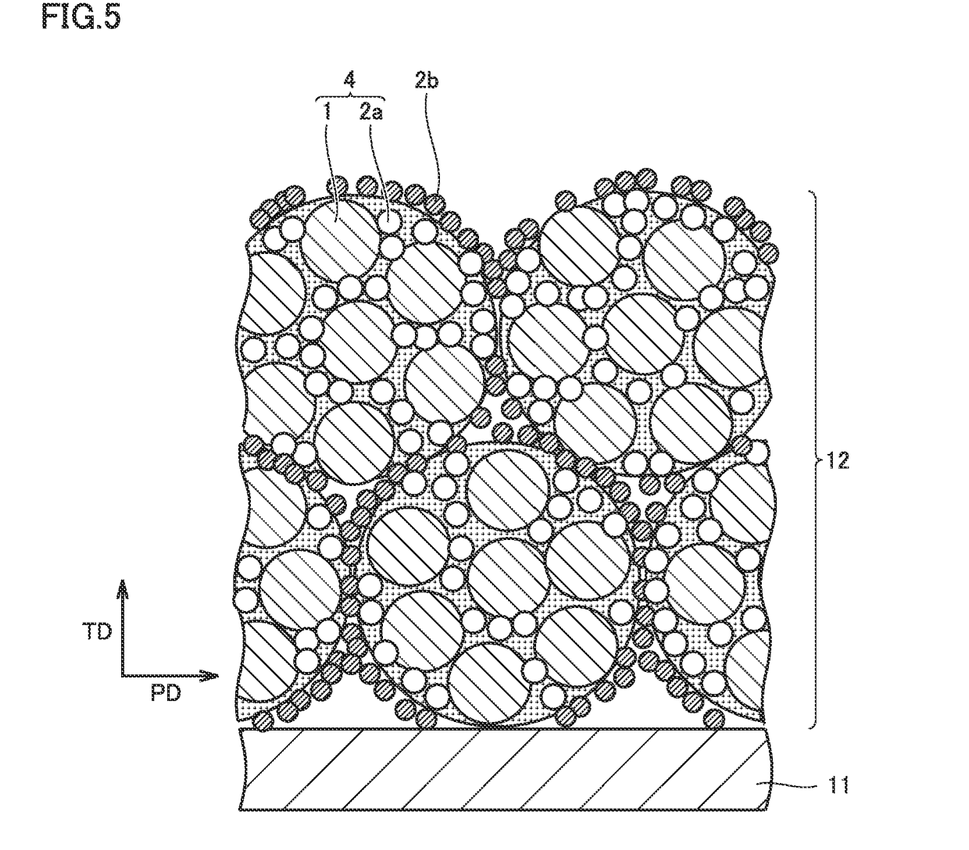
FIG. 5 is a schematic view showing a thickness-direction cross section of a positive electrode composite material layer according to the embodiment of the present invention.

FIG. 5 is a schematic view showing a thickness-direction cross section of the positive electrode composite material layer. A direction TD in FIG. 5 represents a thickness direction of the positive electrode composite material layer, and a direction PD orthogonal to direction TD represents one of in-plane directions of the positive electrode composite material layer. The in-plane direction herein is assumed to represent an arbitrary in-plane direction orthogonal to the thickness direction. The cross-sectional structure as in FIG. 5 can be checked by observing a cross section of the positive electrode composite material layer with, for example, a scanning electron microscope (SEM).

As shown in FIG. 5, positive electrode composite material layer 12 is configured by a composite particle 4 including a positive electrode active material 1, a first conductive material 2a and a binder (not shown), and a second conductive material 2b arranged on a surface of composite particle 4 and having a DBP oil absorption number smaller than that of first conductive material 2a. First conductive material 2a may be exposed on the surface of composite particle 4. Second conductive material 2b is also arranged between composite particles 4. As described below, positive electrode composite material layer 12 can be formed by causing the second conductive material to adhere to the surface of composite particle 4 so as to cover this surface and thereafter shaping a powder of the composite particle into a sheet.

When the electrolyte permeates composite particle 4 in positive electrode composite material layer 12, the electrolyte is captured by first conductive material 2a having a large DBP oil absorption number. As a result, the electrolyte is held in composite particle 4, i.e., near positive electrode active material 1. On the other hand, second conductive material 2b arranged on the surface of composite particle 4 has a small DBP oil absorption number. Therefore, the number of factors that inhibit the movement of the electrolyte in the in-plane direction is considered to be small. As a result, in the positive electrode composite material layer, a decrease in absolute quantity of the electrolyte can be suppressed and variations in distribution of the electrolyte can be suppressed.

[Positive Electrode Active Material]

The positive electrode active material is not particularly limited. $LiCoO_2$, $LiNiO_2$, a compound expressed by a general formula of $LiNi_aCo_bO_2$ (where a+b=1, 0<a<1 and 0<b<1), $LiMnO_2$, $LiMn_2O_4$, a compound expressed by a general formula of $LiNi_aCo_bMn_cO_2$ (where a+b+c=1, 0<a<1, 0<b<1, and 0<c<1), $LiFePO_4$ and the like may, for example, be used as the positive electrode active material. Here, examples of the compound expressed by the general formula of $LiNi_aCo_bMn_cO_2$ include $LiNi_{1/3}Co_{1/3}Mn_{1/3}O_2$ and the like. An average particle size of the positive electrode active material is, for example, approximately 1 to 20 μm. "Average particle size" herein refers to a particle size (so-called d50) at a cumulative value of 50% in the volume-based particle size distribution measured by a laser diffraction scattering method.

[Conductive Material]

Carbon blacks such as acetylene black, lampblack, thermal black, furnace black (e.g., "Ketjen black (registered trademark)" and the like), and channel black are, for example, suitable for the conductive material of the present embodiment.

From the perspective of ensuring a quantity of the electrolyte held in the composite particle, it is preferable that the DBP oil absorption number of the first conductive material included in the composite particle is larger. The DBP oil absorption number of the first conductive material is preferably equal to or larger than 100 ml/100 g. "DBP oil absorption number" herein refers to an absorption quantity of butyl phthalate measured in accordance with "JIS K6217-4: Carbon Black for Rubber, Basic Characteristics, Section 4: Method for Obtaining Oil Absorption Number". The DBP oil absorption number of the first conductive material is more preferably equal to or larger than 150 ml/100 g, and particularly preferably equal to or larger than 200 ml/100 g. An upper limit of the DBP oil absorption number of the first conductive material is not particularly limited. The upper limit of the DBP oil absorption number of the first conductive material may, for example, be 500 ml/100 g, 400 ml/100 g, or 300 ml/100 g. The DBP oil absorption number of the first conductive material can also be set to be within a range of 100 ml/100 g to 200 ml/100 g.

From the perspective of increasing the fluidity of the electrolyte outside the composite particle, it is preferable that the DBP oil absorption number of the second conductive material arranged on the surface of the composite particle is smaller. The DBP oil absorption number of the second conductive material is preferably equal to or larger than 30 ml/100 g and equal to or smaller than 90 ml/100 g. A reason why a lower limit of the DBP oil absorption number is set at 30 ml/100 g is that it is currently difficult to produce a conductive material having a DBP oil absorption number smaller than 30 ml/100 g. Therefore, as long as the productivity is ignored, a conductive material having a DBP oil absorption number larger than 0 ml/100 g and smaller than 30 ml/100 g may be used. The DBP oil absorption number of the second conductive material is more preferably equal to or smaller than 80 ml/100 g, and particularly preferably equal to or smaller than 60 ml/100 g.

A difference between the DBP oil absorption number of the first conductive material and the DBP oil absorption number of the second conductive material is preferably equal to or larger than 10 ml/100 g. As this difference increases, a difference occurs in fluidity of the electrolyte inside and outside the composite particle and the effect of the present embodiment is expected to be enhanced. The difference between the DBP oil absorption number of the first conductive material and the DBP oil absorption number of the second conductive material is more preferably equal to or larger than 60 ml/100 g, and particularly preferably equal to or larger than 110 ml/100 g.

The other powder properties of the conductive materials are not particularly limited. An average particle size of the first conductive material is, for example, approximately 100 nm to 0.5 μm. An average particle size of the second conductive material is, for example, approximately 100 nm to 1.0 μm. A primary particle size of the conductive material is, for example, approximately 1 to 50 nm.

A total quantity of the first conductive material and the second conductive material with respect to 100 parts by mass of the positive electrode active material is, for example, equal to or larger than 2 parts by mass and equal to or smaller than 10 parts by mass, and preferably equal to or larger than 5 parts by mass and equal to or smaller than 8 parts by mass. A mass ratio between the first conductive material and the second conductive material may, for example, be approximately 3:7 to 7:3.

[Binder]

The binder is not particularly limited. Polyvinylidene fluoride (PVDF), polytetrafluoroethylene (PTFE) and the like may, for example, be used as the binder. A blending quantity of the binder may, for example, be approximately 1 to 5 parts by mass with respect to 100 parts by mass of the positive electrode active material.

[Negative Electrode]

Figure 6:
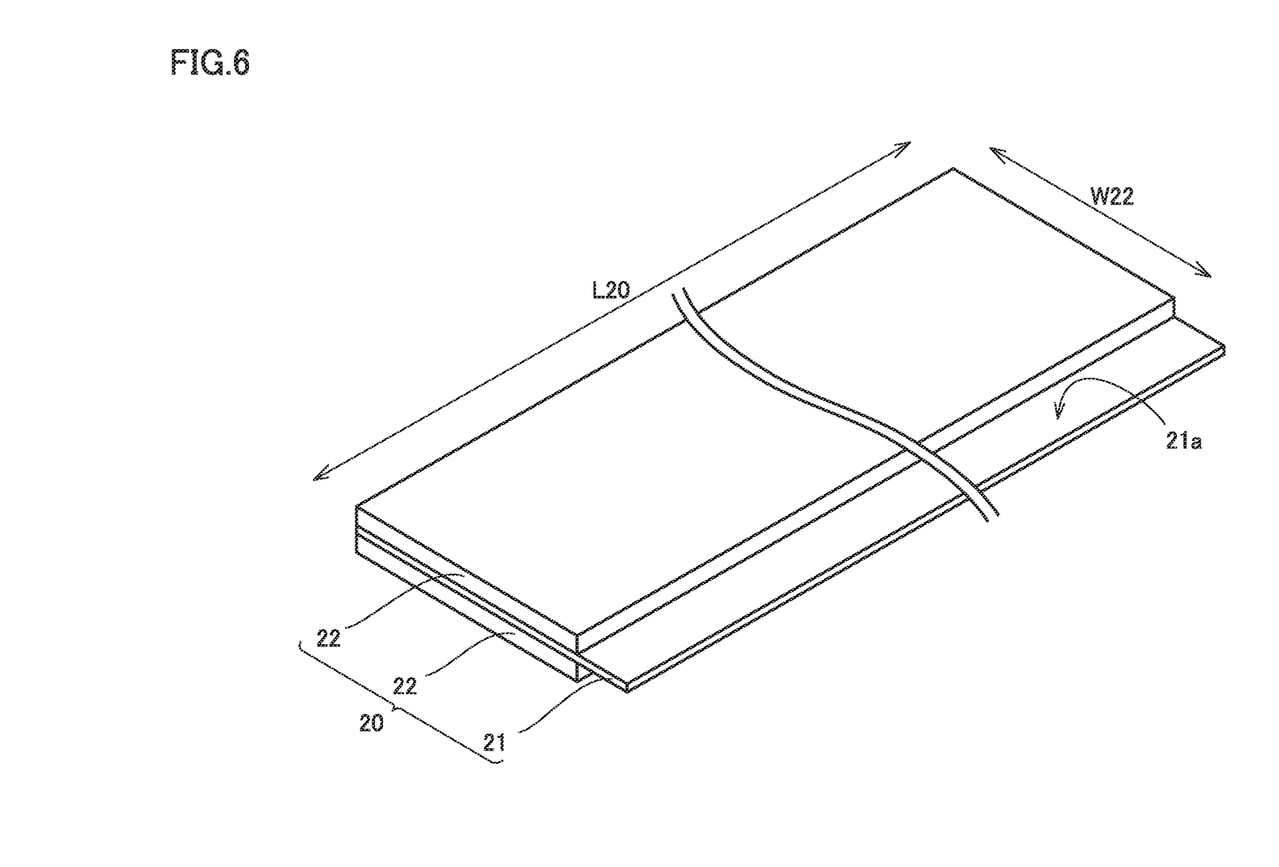
FIG. 6 is a schematic view showing one example of a configuration of a negative electrode according to the embodiment of the present invention.

FIG. 6 is a schematic view showing one example of a configuration of the negative electrode according to the present embodiment. As shown in FIG. 6, negative electrode 20 is a long strip-like sheet member. Negative electrode 20 includes a negative electrode collector foil 21, and negative electrode composite material layers 22 arranged on both main surfaces of negative electrode collector foil 21. Negative electrode collector foil 21 is, for example, a copper (Cu) foil. A foil exposed portion 21a where negative electrode collector foil 21 is exposed from negative electrode composite material layer 22 serves as a site for connection with negative electrode terminal 72 in electrode assembly 80 (see FIG. 2).

The negative electrode composite material layer includes a negative electrode active material, a thickener and a binder. The negative electrode active material is not particularly limited. The negative electrode active material may be a carbon-based negative electrode active material such as graphite and coke, or may be an alloy-based negative electrode active material including silicon (Si), tin (Sn) and the like. Carboxymethylcellulose (CMC) and the like can, for example, be used as the thickener. A blending quantity of the thickener may, for example, be approximately 0.3 to 2 parts by mass with respect to 100 parts by mass of the negative electrode active material. Styrene-butadiene rubber (SBR) and the like can, for example, be used as the binder. A blending quantity of the binder may, for example, be approximately 0.3 to 2 parts by mass with respect to 100 parts by mass of the negative electrode active material.

[Separator]

The separator is a film member that allows the electrolyte to pass therethrough and prevents contact between the positive electrode and the negative electrode. The separator may, for example, be a single-layer or multi-layer microporous membrane made of polyethylene (PE), polypropylene (PP) and the like. The separator may be a separator having a heat-resistant layer formed on a surface thereof. The heat-resistant layer is formed of, for example, an inorganic particle such as alumina, a heat-resistant resin such as aramid, or the like.

[Electrolyte]

The electrolyte is a liquid electrolyte obtained by dissolving a supporting electrolyte in an aprotic solvent. The aprotic solvent may, for example, be cyclic carbonates such as ethylene carbonate (EC), propylene carbonate (PC), butylene carbonate (BC), and γ-butyrolactone (γBL), or may be chain-like carbonates such as dimethyl carbonate (DMC), ethyl methyl carbonate (EMC) and diethyl carbonate (DEC). The aprotic solvent may be a mixed solvent obtained by selecting two or more types from the cyclic carbonates and the chain-like carbonates and mixing them. Examples of the supporting electrolyte include a lithium (Li) salt such as $LiPF_6$, $LiBF_4$, $LiClO_4$, $LiAsF_6$, $Li[(CF_3SO_2)_2N]$, $Li[(FSO_2)_2N]$, and $Li(CF_3SO_3)$. Two or more types of Li salts may also be used.

[Method for Manufacturing Non-Aqueous Electrolyte Secondary Battery]

Figure 7:
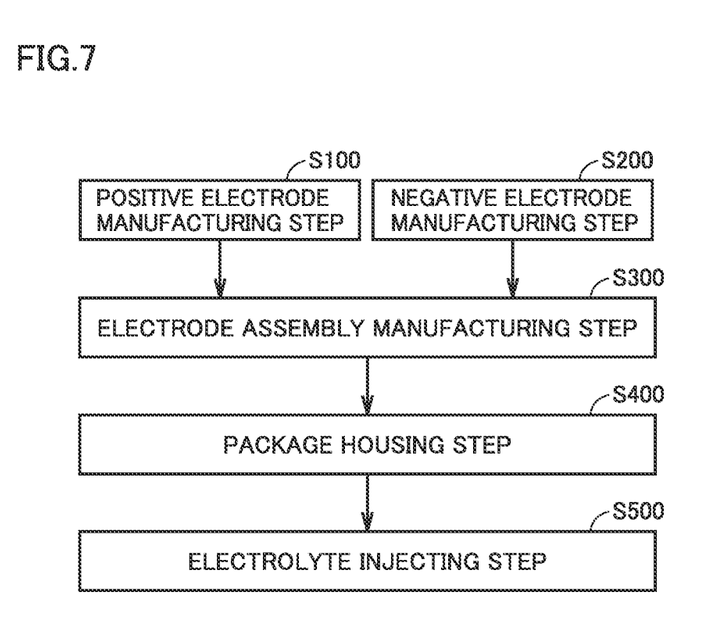
FIG. 7 is a flowchart showing an overview of a method for manufacturing the non-aqueous electrolyte secondary battery according to the embodiment of the present invention.

The non-aqueous electrolyte secondary battery according to the present embodiment can be manufactured by using, for example, a manufacturing method described below. FIG. 7 is a flowchart showing an overview of a method for manufacturing the non-aqueous electrolyte secondary battery according to the present embodiment. As shown in FIG. 7, this manufacturing method includes a positive electrode manufacturing step (S100), a negative electrode manufacturing step (S200), an electrode assembly manufacturing step (S300), a package housing step (S400), and an electrolyte injecting step (S500). Each step will be described below.

[Positive Electrode Manufacturing Step (S100)]

Figure 8:
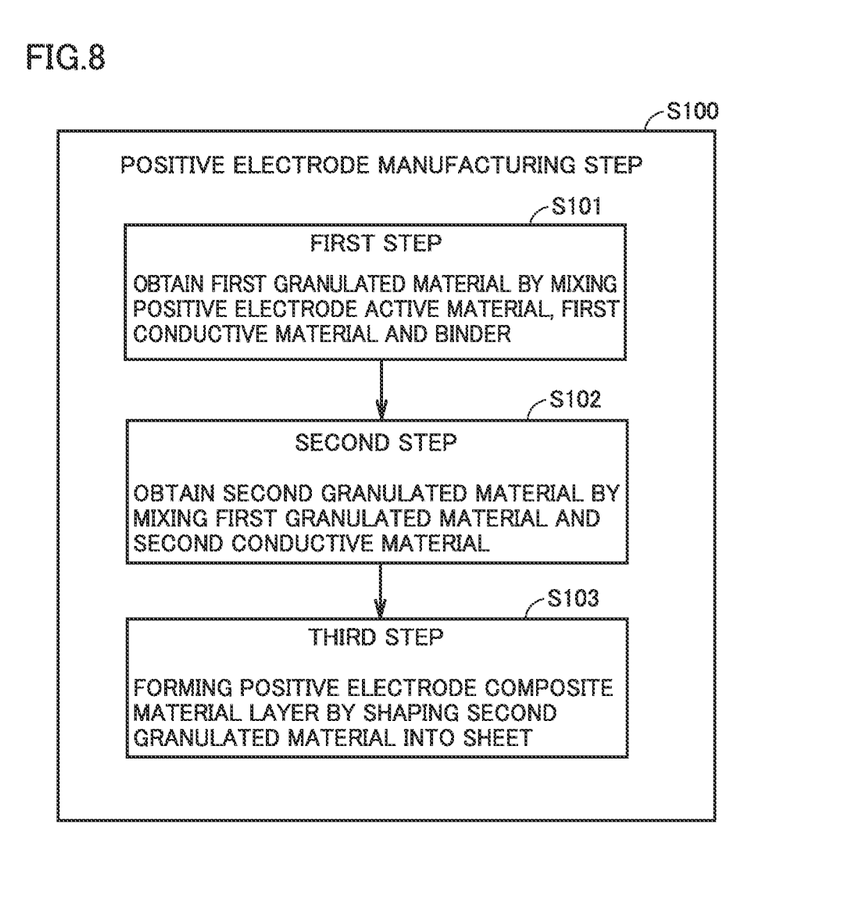
FIG. 8 is a flowchart showing an overview of a positive electrode manufacturing step according to the embodiment of the present invention.

FIG. 8 is a flowchart showing an overview of the positive electrode manufacturing step. As shown in FIG. 8, the positive electrode manufacturing step includes a first step (S101), a second step (S102) and a third step (S103). Therefore, the method for manufacturing the non-aqueous electrolyte secondary battery includes the first step, the second step and the third step. The first to third steps are performed in this order.

[First Step (S101)]

In the first step, a first granulated material is obtained by mixing the positive electrode active material, the first conductive material and the binder. The first granulated material is an aggregate (powder) of the composite particle including the positive electrode active material, the first conductive material and the binder. A general mixing device and granulating device can be used to mix the materials. For example, a planetary mixer, "High Flex Gral (product name)" and "High Speed Mixers (product name)" manufactured by Earthtechnica Co, Ltd., and the like can be used. A mixing condition can be changed as appropriate, depending on powder properties of each component, a batch quantity and the like. In the first step, wet-type mixing can also be performed by using a solvent. In this case, a quantity of the solvent may be adjusted such that a solid content concentration of the first granulated material is, for example, approximately 80 to 95% by mass. By bringing the positive electrode active material and the first conductive material into contact with each other, with the solid content concentration being high, these can be bonded strongly. The solvent may be selected as appropriate, depending on a type of the binder and the like. N-methyl-2-pyrrolidone (NMP) and the like can, for example, be used as the solvent.

[Second Step (S102)]

In the second step, a second granulated material is obtained by mixing the first granulated material and the second conductive material. The second step can be performed in the same mixing device subsequently to the first step. Namely, the first granulated material is formed in a vessel of the mixing device, and thereafter, the second conductive material is added to and further mixed with the first granulated material, to obtain the second granulated material. As described above, the second conductive material is a conductive material having a DBP oil absorption number smaller than that of the first conductive material introduced in the first step.

In the second step, the solvent and the binder may be added together with the second conductive material. A solid content concentration of the second granulated material may be adjusted to be, for example, approximately 65 to 75% by mass. As a result of the second step, the second conductive material adheres to the surface of the composite particle obtained in the first step. In the second granulated material, the composite particle may be combined with still another composite particle. A diameter of a granule that forms the second granulated material may be adjusted to be, for example, approximately 2 to 3 mm. The diameter of the granule can be adjusted depending on, for example, the solid content concentration.

[Third Step (S103)]

Figure 9:
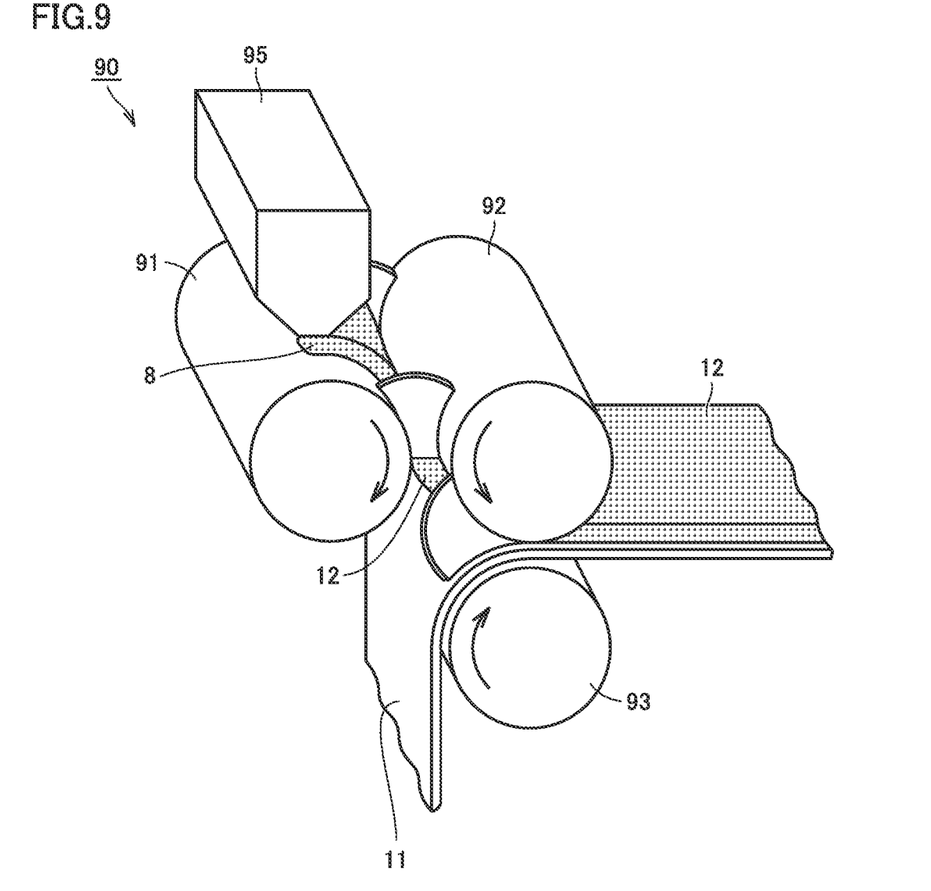
FIG. 9 is a schematic view illustrating one example of a third step according to the embodiment of the present invention.

In the third step, the positive electrode composite material layer is formed by shaping the second granulated material into a sheet. FIG. 9 is a schematic view illustrating one example of the third step. The third step can be performed by using a shaping and transferring device 90 shown in FIG. 9. The third step will be described below in accordance with the operation of shaping and transferring device 90.

The second granulated material obtained in the second step is supplied to a feeder 95 of shaping and transferring device 90. Second granulated material 8 is supplied from feeder 95 to between an A roll 91 and a B roll 92. An arrow in FIG. 9 represents a rotation direction of each roll member. Second granulated material 8 is conveyed along the rotation direction of A roll 91 or B roll 92 and reaches a gap between A roll 91 and B roll 92. In the gap, pressure is applied to the second granulated material by A roll 91 and B roll 92. As a result, the second granulated material is shaped into sheet-like positive electrode composite material layer 12. A coating weight (mass per unit area) and a thickness of the positive electrode composite material layer are adjusted depending on the gap between A roll 91 and B roll 92. The coating weight and the thickness of the positive electrode composite material layer can be changed as appropriate, depending on the battery specifications.

Since the granulated material is not formed into a paste but directly shaped into a sheet as described above, the positive electrode composite material layer can be formed, with the arrangement relationship among the positive electrode active material, the first conductive material and the second conductive material being maintained.

Furthermore, shaping and transferring device 90 is configured to arrange the positive electrode composite material layer on the main surface of the positive electrode collector foil. As shown in FIG. 9, positive electrode composite material layer 12 obtained above is conveyed along the rotation direction of B roll 92. Positive electrode collector foil 11 is conveyed along the rotation direction of a C roll 93. In a gap between B roll 92 and C roll 93, pressure is applied to positive electrode composite material layer 12 and positive electrode collector foil 11 by B roll 92 and C roll 93. As a result, positive electrode composite material layer 12 is transferred and pressure-bonded to one main surface of positive electrode collector foil 11. In this manner, positive electrode composite material layer 12 is arranged on the main surface of positive electrode collector foil 11.

Thereafter, the solvent remaining in the positive electrode composite material layer may be vaporized by using a drying furnace (not shown). However, in the present embodiment, the solid content concentration of the granulated material is high and the quantity of the solvent is small, and thus, such drying operation may be unnecessary in some cases. By repeating the aforementioned operation, the positive electrode composite material layers can be arranged on both main surfaces of the positive electrode collector foil. After the positive electrode composite material layers are arranged on both main surfaces of the positive electrode collector foil, various types of processing such as rolling and cutting (slit) are performed. Positive electrode 10 shown in FIG. 4 is thus completed.

[Negative Electrode Manufacturing Step (S200)]

In the negative electrode manufacturing step, negative electrode 20 shown in, for example, FIG. 6 is manufactured. Negative electrode 20 is manufactured as follows, for example. The negative electrode active material, the thickener and the binder are kneaded in a prescribed solvent (e.g., water) to fabricate a negative electrode paste. The negative electrode paste is coated on both main surfaces of the negative electrode collector foil and is dried. The negative electrode composite material layer is thus formed. The negative electrode composite material layer is compressed to adjust a thickness thereof. The negative electrode composite material layer and the negative electrode collector foil are cut to have a prescribed dimension.

[Electrode Assembly Manufacturing Step (S300)]

In the electrode assembly manufacturing step, the electrode assembly is manufactured. First, as shown in FIG. 3, positive electrode 10 and negative electrode 20 are stacked with separator 40 interposed therebetween, and are wound. An oval wound body is thus obtained. At this time, foil exposed portion 11a, 21a of each electrode is arranged at an end in the direction along a winding axis Aw. Furthermore, the wound body is shaped to have a flat outer shape, and thus, electrode assembly 80 is obtained.

[Package Housing Step (S400)]

In the package housing step, the electrode assembly is housed in the package. As shown in FIG. 2, at foil exposed portions 11a and 21a, electrode assembly 80 is connected to positive electrode terminal 70 and negative electrode terminal 72 provided at lid 54, and is housed in prismatic case 52. Prismatic case 52 and lid 54 are joined by, for example, laser welding.

[Electrolyte Injecting Step (S500)]

In the electrolyte injecting step, the electrolyte is injected into the package. The electrolyte can be injected, for example, from the liquid injection port (not shown) provided in the package. After injection, the liquid injection port is sealed by prescribed means, and thereby, the package is sealed. Non-aqueous electrolyte secondary battery 100 shown in FIG. 1 is thus completed.

Although the present embodiment has been described above by taking the prismatic battery as an example, the present embodiment is not limited to the prismatic battery. The present embodiment is also applicable to, for example, a cylindrical battery or a laminated battery. In addition, the electrode assembly is not limited to the wound-type electrode assembly. The electrode assembly may be a stacked electrode assembly obtained by alternately stacking the positive electrodes and the negative electrodes with the separators interposed therebetween.

Example

Manufacturing of Non-Aqueous Electrolyte Secondary Battery

Non-aqueous electrolyte secondary batteries (rated capacity: 3.6 Ah) according to samples A1 to A9 and B1 to B7 were manufactured as follows. Samples A1 to A9 are Examples and samples B1 to B7 are Comparative Examples.

[Sample A1]

1. Positive Electrode Manufacturing Step (S100)

First, the following materials were prepared:

positive electrode active material: $LiNi_{1/3}Co_{1/3}Mn_{1/3}O_2$ first conductive material: acetylene black (DBP oil absorption number: 100 ml/100 g)

second conductive material: acetylene black (DBP oil absorption number: 30 ml/100 g)

binder: PVDF solvent: NMP positive electrode collector foil: Al foil (thickness: 15 μm).

1-1. First Step (S101)

The positive electrode active material (90 parts by mass), the first conductive material (4 parts by mass), the binder (1.5 parts by mass), and the solvent were put into the mixing vessel of the planetary mixer, and were stirred and mixed. A quantity of the solvent was adjusted such that a solid content concentration of the mixture was 85% by mass. A first granulated material was thus obtained. The first granulated material is a powder of a composite particle including the positive electrode active material, the first conductive material and the binder.

1-2. Second Step (S102)

The second conductive material (4 parts by mass), the binder (0.5 parts by mass) and the solvent were put into the aforementioned mixing vessel, and were further stirred and mixed. A quantity of the solvent was adjusted such that a solid content concentration of the mixture was 70% by mass. Thus, the second conductive material adhered to the surface of the composite particle and a second granulated material was obtained. In the second granulated material, a diameter of a granule was about 2.5 mm.

1-3. Third Step (S103)

By using shaping and transferring device 90 shown in FIG. 9, the second granulated material was shaped into a sheet as described above to form positive electrode composite material layer 12. Furthermore, by using the same device, positive electrode composite material layers 12 were transferred and pressure-bonded to both main surfaces of positive electrode collector foil 11.

Thereafter, a thickness of the positive electrode composite material layer was adjusted by using a rolling machine. The thickness (one side) of the positive electrode composite material layer was set at 25 μm. Furthermore, the positive electrode composite material layers and the positive electrode collector foil were cut to have a prescribed dimension. Positive electrode 10 shown in FIG. 4 was thus obtained. Dimensions shown in FIG. 4 were set as follows:

width W12 of the positive electrode composite material layer: 98 mm length L10 of the positive electrode: 3000 mm.

2. Negative Electrode Manufacturing Step (S200)

The following materials were prepared:

negative electrode active material: carbon-coated spherical graphite (spherical graphite coated with amorphous carbon)

thickener: CMC (product name: "BSH-6" manufactured by Dai-ichi Kogyo Seiyaku Co, Ltd.)

binder: SBR solvent: water negative electrode collector foil: Cu foil (thickness: 14 μm).

The negative electrode active material, the thickener, the binder, and the solvent were put into the mixing vessel of the planetary mixer, and were kneaded. A negative electrode paste was thus obtained. A blending ratio (mass ratio) of a solid content of the negative electrode paste was set at negative electrode active material:thickener:binder=98.6: 0.7:0.7.

By using a die coater, the negative electrode paste obtained above was coated on both main surfaces of the negative electrode collector foil and dried to form the negative electrode composite material layer. A thickness of the negative electrode composite material layer was adjusted by using the rolling machine. The thickness (one side) of the negative electrode composite material layer was set at 68 μm. Furthermore, the negative electrode composite material layer and the negative electrode collector foil were cut to have a prescribed dimension. Negative electrode 20 shown in FIG. 6 was thus obtained. Dimensions shown in FIG. 6 were set as follows:

width W22 of the negative electrode composite material layer: 102 mm length L20 of the negative electrode: 3100 mm.

3. Electrode Assembly Manufacturing Step (S300)

A microporous membrane having a three-layer structure of a PP layer/a PE layer/a PP layer was prepared as a separator base member. A thickness of the separator base member was set at 20 μm.

By using a disperser, an alumina particle and acrylic rubber were dispersed in the solvent to fabricate slurry that will form a heat-resistant layer. This slurry was coated on the separator base member by using a gravure coater, and was dried to form the heat-resistant layer. A thickness of the heat-resistant layer was set at 4 μm. The separator was thus obtained.

As shown in FIG. 3, positive electrode 10 and negative electrode 20 were stacked with separator 40 obtained above being interposed therebetween, and were wound. An oval wound body was thus obtained. By using a flat plate pressing machine, the wound body was shaped into a flat shape. Pressing conditions were set as follows. Electrode assembly 80 was thus obtained.

pressing temperature: room temperature pressing pressure: 4 kN/cm$^2$ pressing time: 2 minutes 4. Package Housing Step (S400)

As shown in FIG. 2, positive electrode terminal 70 and negative electrode terminal 72 were connected to electrode assembly 80, and electrode assembly 80 was housed in package 50.

5. Electrolyte Injecting Step (S500)

An electrolyte (41 g) having the following composition was injected from the liquid injection port provided in the package:

supporting electrolyte: LiPF$_6$ (1.0 mol/L)

solvent: [EC:DMC:EMC=3:4:3].

After injection, the liquid injection port was sealed and the package was sealed. The non-aqueous electrolyte secondary battery according to sample A1 was thus manufactured.

[Samples A2 to A9, Samples B1 to B7]

Except that various types of acetylene black having different DBP oil absorption numbers were prepared and combined as shown in Table 1, non-aqueous electrolyte secondary batteries according to samples A2 to A9 and B1 to B7 were manufactured similarly to sample A1. In samples B1, B4, B6, and B7, a granulated material was obtained with one-stage granulation by using one type of conductive material, and the granulated material was shaped into a sheet to form the positive electrode composite material layer.

TABLE 1

| | DBP oil absorption number (X) of first conductive material included in composite particle [ml/100 g] | DBP oil absorption number (Y) of second conductive material arranged on surface of composite particle [ml/100 g] | Difference between X and Y (X − Y) [ml/100 g] | Battery performance IV resistance after high-rate cycle [—] |
|---|---|---|---|---|
| B1 | 80 | no second conductive material | — | 1.08 |
| B2 | 80 | 90 | −10 | 1.11 |
| B3 | 80 | 100 | −20 | 1.15 |
| B4 | 100 | no second conductive material | — | 1.00 |
| A1 | 100 | 30 | 70 | 0.88 |
| A2 | 100 | 60 | 40 | 0.92 |
| A3 | 100 | 90 | 10 | 0.97 |
| B5 | 100 | 100 | 0 | 1.00 |
| B6 | 150 | no second conductive material | — | 1.00 |
| A4 | 150 | 30 | 120 | 0.81 |
| A5 | 150 | 60 | 90 | 0.86 |
| A6 | 150 | 90 | 60 | 0.92 |
| B7 | 200 | no second conductive material | — | 1.00 |
| A7 | 200 | 30 | 170 | 0.74 |
| A8 | 200 | 60 | 140 | 0.80 |
| A9 | 200 | 90 | 110 | 0.88 |

[Evaluation]

Each non-aqueous electrolyte secondary battery obtained above was evaluated by a high-rate cycle test. Cycle conditions were set as follows:

charging condition: current value 36 A, cut voltage 4.1 V
discharging condition: current value 1.8 A, cut voltage 3.0 V
test temperature: 60° C.
the number of cycles: 2000 cycles.

After the end of 2000 cycles, an IV resistance of the battery was measured. First, at 25° C., an SOC (State of Charge) of the battery was adjusted to be 60%. After the SOC was adjusted, pulse discharging at 36 A×10 seconds was performed and a quantity of voltage drop was measured. By dividing the quantity of voltage drop by the current value (36 A) of the pulse discharging, the IV resistance was calculated. The result is shown in Table 1. The numerical values indicated in the section of "IV resistance after high-rate cycle" in Table 1 refer to the relative values when a reference value in this experiment is set at "1". In Table 1, as the numerical value becomes smaller, the effect of suppressing an increase in resistance becomes more excellent.

[Result and Discussion]

1. Samples B1, B4, B6, and B7

In these samples, one type of conductive material is included in the positive electrode composite material layer. As can be seen from Table 1, when one type of conductive material is included, the effect of suppressing an increase in resistance is hardly seen even if the DBP oil absorption number is increased.

2. Samples B2, B3 and B5

Each of these samples includes two types of conductive materials. However, in these samples, the DBP oil absorption number of the first conductive material included in the composite particle is the same as the DBP oil absorption number of the second conductive material arranged on the surface of the composite particle, or the DBP oil absorption number of the second conductive material is larger than the DBP oil absorption number of the first conductive material. As can be seen from Table 1, the IV resistance after the high-rate cycle tends to be high in these samples.

3. Samples A1 to A9

In samples A1 to A9, each of which includes the positive electrode composite material layer, the positive electrode composite material layer including the composite particle including the positive electrode active material, the first conductive material and the binder, and the second conductive material arranged on the surface of the composite particle and having the DBP oil absorption number smaller than that of the first conductive material, the IV resistance lower than the reference value (=1) can be achieved. This is considered to be because the first conductive material allows ensuring of the quantity of the electrolyte in the composite particle and the second conductive material allows ensuring of the fluidity of the electrolyte outside the composite particle.

A group of samples A1 to A3, a group of samples A4 to A6, and a group of samples A7 to A9 are compared in terms of IV resistance. Then, it can be seen that as the DBP oil absorption number of the first conductive material becomes larger, the effect of suppressing an increase in resistance becomes more excellent. Based on this result, it is recognized that the DBP oil absorption number of the first conductive material is preferably equal to or larger than 100 ml/100 g, more preferably equal to or larger than 150 ml/100 g, and particularly preferably equal to or larger than 200 ml/100 g.

Furthermore, the samples (e.g., samples A1 to A3) in each group are compared. Then, it can be seen that as the difference between the DBP oil absorption number of the first conductive material and the DBP oil absorption number of the second conductive material becomes larger, the effect of suppressing an increase in resistance becomes more excellent. Based on this result, it is recognized that the DBP oil absorption number of the second conductive material is preferably equal to or larger than 30 ml/100 g and equal to or smaller than 90 ml/100 g, and more preferably equal to or larger than 30 ml/100 g and equal to or smaller than 60 ml/100 g.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-aqueous electrolyte secondary battery comprising a positive electrode composite material layer, said positive electrode composite material layer including:
   a composite particle comprising a plurality of positive electrode active material primary particles, a plurality of first conductive material primary particles and a binder, all of which are joined together in the form of a granule; and
   second conductive material primary particles arranged on a surface of said composite particle and having a DBP oil absorption number smaller than that of said first conductive material primary particles,
   wherein said first conductive material primary particles are first carbon black particles,
   said second conductive material primary particles are second carbon black particles, the DBP oil absorption number of said first conductive material primary particles is equal to or larger than 100 ml/100 g, and the DBP oil absorption number of said second conductive material primary particles is equal to or larger than 30 ml/100 g and equal to or smaller than 90 ml/100 g.

2. The non-aqueous electrolyte secondary battery according to claim 1, wherein the DBP oil absorption number of said first conductive material primary particles is equal to or larger than 200 ml/100 g, and the DBP oil absorption number of said second conductive material primary particles is equal to or larger than 30 ml/100 g and equal to or smaller than 60 ml/100 g.

3. The non-aqueous electrolyte secondary battery according to claim 1, wherein a difference between said DBP oil absorption number of said first conductive material primary particles and said DBP oil absorption number of said second conductive material primary particles is equal to or larger than 110 ml/100 g.

4. The non-aqueous electrolyte secondary battery according to claim 1, wherein an average particle size of said composite particles is 2 mm to 3 mm.

5. The non-aqueous electrolyte secondary battery according to claim 1, wherein wherein the only carbon black particles included in the composite particle are said first carbon black particles.

6. The non-aqueous electrolyte secondary battery according to claim 1, wherein wherein the only carbon black particles arranged on the surface of said composite particle are said second carbon black particles.

7. A method for manufacturing the non-aqueous electrolyte secondary battery as recited in claim 1, comprising:

a first step of obtaining a first granulated material by mixing said positive electrode active material primary particles, said first conductive material primary particles and said binder;

a second step of obtaining a second granulated material by mixing said first granulated material and said second conductive material primary particles; and a third step of forming said positive electrode composite material layer by shaping said second granulated material into a sheet.

8. The method according to claim 7, wherein an average particle size of said first conductive material primary particles is 100 nm to 0.5 μm.

9. The method according to claim 7, wherein an average particle size of said second conductive material primary particles is 100 nm to 1 μm.

10. The method according to claim 7, wherein an average particle size of said positive electrode active material primary particles 1 μm to 20 μm.

11. The method according to claim 7, wherein an average particle size of said second granulated material is 2 mm to 3 mm.

12. The method according to claim 7, wherein an average particle size of said first conductive material primary particles is 100 nm to 0.5 μm, an average particle size of said second conductive material primary particles is 100 nm to 1 μm, an average particle size of said positive electrode active material primary particles 1 μm to 20 μm, and an average particle size of said second granulated material is 2 mm to 3 mm.

13. The method according to claim 7, wherein the DBP oil absorption number of said first conductive material primary particles is equal to or larger than 200 ml/100 g, and the DBP oil absorption number of said second conductive material primary particles is equal to or larger than 30 ml/100 g and equal to or smaller than 60 ml/100 g.

14. The method according to claim 7, wherein a difference between said DBP oil absorption number of said first conductive material primary particles and said DBP oil absorption number of said second conductive material primary particles is equal to or larger than 110 ml/100 g.

* * * * *